Figure 1:
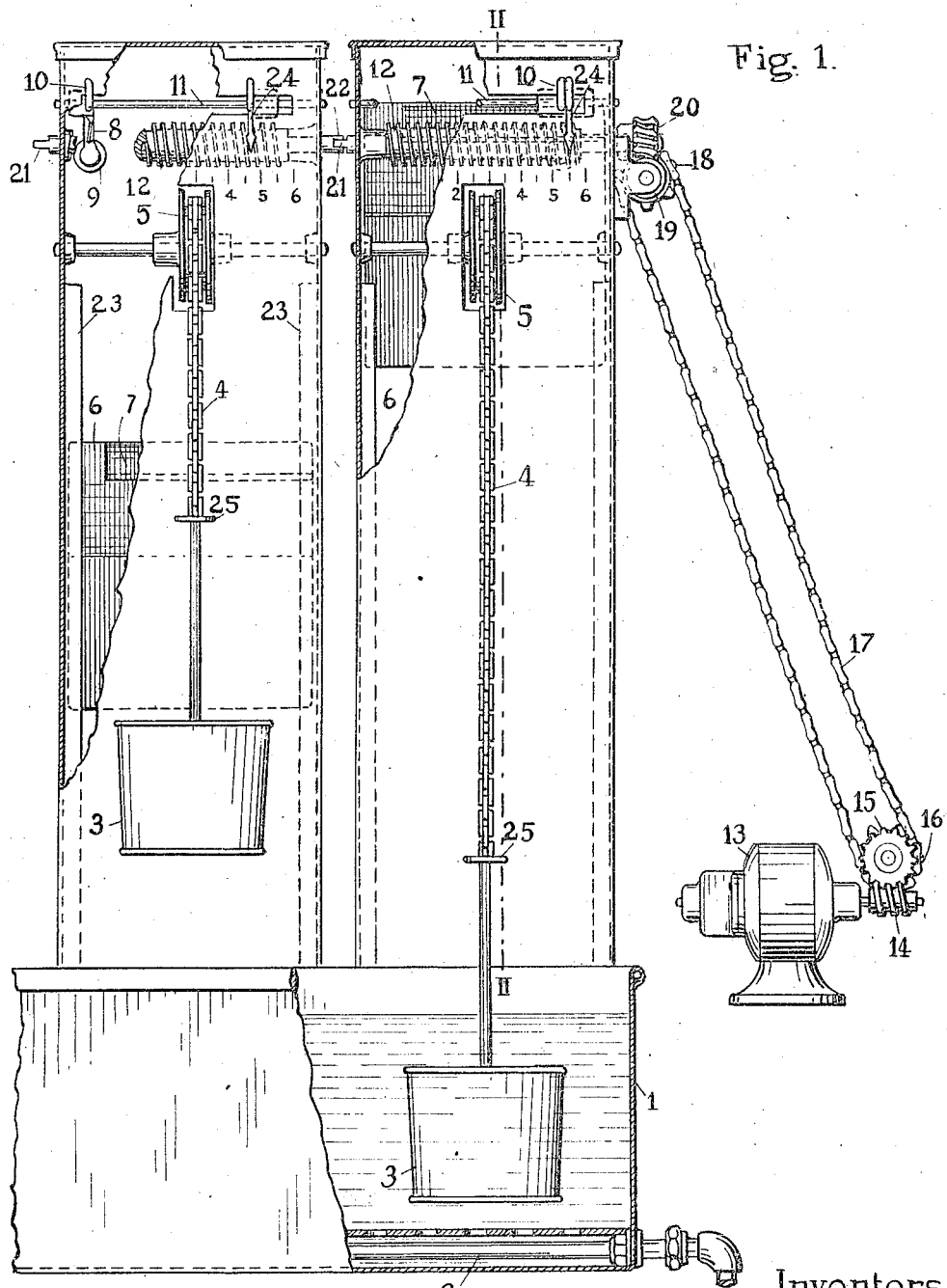

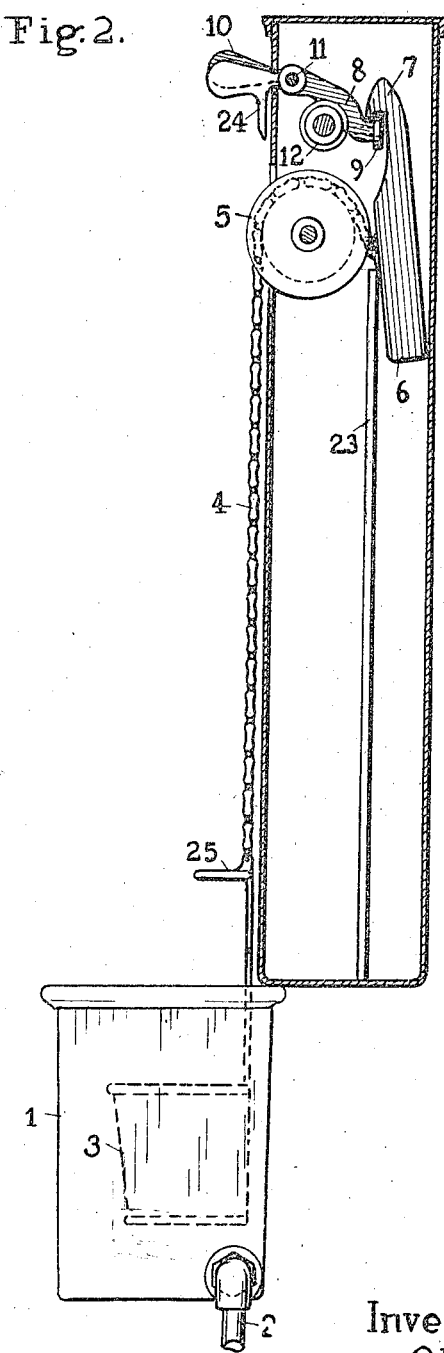

UNITED STATES PATENT OFFICE.

CHARLES SPITZ AND CLEMENT A. DODSON, OF NEW YORK, N. Y.

EGG-BOILER.

1,167,947.  Specification of Letters Patent.  Patented Jan. 11, 1916.

Application filed June 4, 1914. Serial No. 842,823.

*To all whom it may concern:*

Be it known that we, CHARLES SPITZ and CLEMENT A. DODSON, both citizens of the United States of America, and residents of the city of New York, borough of Manhattan, in the county of New York and State of New York, have invented certain new and useful Improvements in Egg-Boilers, of which the following is a specification.

The object of our invention is to provide a reliable, durable and easily operated apparatus in conjunction with a tank for boiling eggs which can be set to automatically withdraw the eggs from the water when the desired time has elapsed.

A further object is to provide a plurality of such devices which may be started at different times and which will operate independently of one another while joined so as to have their timing mechanisms actuated from a common source.

In the accompanying two sheets of drawings which form a part of this application Figure 1 is a front elevation, broken away, of an apparatus embodying our invention with two timing devices. Fig. 2 is a side elevation with one of the timing devices in section on the line II—II of Fig. 1.

The apparatus comprises a tank 1 in which water is kept boiling in any convenient manner—a pipe 2 for the circulation of steam under pressure being shown for the purpose. The eggs are carried by receptacles 3, 3, which are suitably perforated to permit the water to freely circulate through them from the tank and to drain off at once when the receptacles are withdrawn. Each receptacle is suspended by a chain 4 which is carried over a pulley 5 and attached to a weight 6 which is heavy enough to overbalance the receptacle and as many eggs as can be carried therein. The weight is formed with a hook 7 having an extended lip. A traveling half-nut 8 has a horn carrying a roller 9 which is engaged by the hook and the weight is thereby supported. The nut has a handle 10 and is guided by a rod 11 about which the nut can be rocked into and out of engagement with a lead-screw 12. The lead-screw is driven by any convenient power which will cause it to revolve slowly and at a uniform speed. For this purpose an electric motor 13 is shown from which the power is transmitted through a speed-reducing worm 14 and gear 15 mounted on the motor, a sprocket 16, chain 17, sprocket 18, worm 19 and gear 20. The chain drive permits the motor to be located at a distance where it will not be affected injuriously by the steam from the boiler. When it is desired to mount several timing devices in connection with the boiler, but one driving means and one lead-screw are necessary. The lead-screw sections may be integral through the several timing devices, or, as shown, coupled together between each two adjacent devices, tongues 21 21 and grooves 22 22 being formed at the ends of the sections for making the couplings. The weight-hook is formed as a rigid part of the weight and is hooked over the roller carried by the half-nut by a tilting of the weight which is brought about by a special organization of the parts. The supporting chain is attached to the weight about midway between the top and bottom and leads off at a slight angle from the vertical. In all positions of the weight except the highest it is drawn against vertical guides 23 23 and takes a vertical position in which when the weight is raised its hook will pass the roller carried by the half-nut. On reaching its highest position the point of attachment of the chain is carried above the guides since the chain has an upward inclination in the direction which the hook faces, and the weight is tilted forward and its hook brought over the roller.

In operating the apparatus, the half-nut is lifted by bearing down on its handle and then traversed to the right and against a pointer 24 which is set at the time indication for which it is desired to boil the eggs. The eggs are dropped in the receptacle and by pressing down on a plate 25 the eggs are brought into the water. The weight at the same time is lifted into engagement with the half-nut and holds the nut against the lead-screw. The screw carries the nut to the left a greater or less distance according to the point from which it was started until the roller is carried beyond the lip of the hook when the weight falls and withdraws the eggs from the boiling water. The pointer remains at the indication to show the time that the eggs were in the water.

What we claim as new, and desire to secure by Letters Patent of the United States, is—

1. In an apparatus for boiling eggs, the combination of a boiler, an egg-receptacle, a weight for withdrawing the receptacle having a hook with an extended lip, a lead-screw, a traveling half-nut for engaging the lead-screw with a support for the weight-hook, and means for operating the lead-screw whereby the half-nut is moved out of engagement with the weight-hook, substantially as described.

2. In an apparatus for boiling eggs, the combination of a boiler, an egg-receptacle, a weight having a hook with an extended lip, a pulley, a chain leading over the pulley and connecting the weight and receptacle with the portion between the pulley and the weight at an upward inclination in the direction which the hook faces, guides for the weight terminated below the point of attachment of the chain to the weight when at its highest position, a lead-screw, a traveling half-nut with a support for the weight-hook, and means for operating the lead-screw, substantially as described.

Signed at New York, N. Y., this 1st day of June, 1914.

CHARLES SPITZ.
    CLEMENT A. DODSON.

Witnesses to both signatures:
    HARRY SALMON,
    HARRY SISKIND.